(12) United States Patent
Kahl et al.

(10) Patent No.: US 7,799,282 B2
(45) Date of Patent: Sep. 21, 2010

(54) SAMPLE CHAMBER FOR A LIQUID

(75) Inventors: Johan-Valentin Kahl, Munich (DE); Roman Zantl, Baldham (DE)

(73) Assignee: ibidi GmbH, Martinsried (DE)

( * ) Notice: Subject to any disclaimer, the term of this patent is extended or adjusted under 35 U.S.C. 154(b) by 747 days.

(21) Appl. No.: 10/542,455

(22) PCT Filed: Jan. 13, 2004

(86) PCT No.: PCT/EP2004/000167

§ 371 (c)(1),
(2), (4) Date: Feb. 28, 2006

(87) PCT Pub. No.: WO2004/062773

PCT Pub. Date: Jul. 29, 2004

(65) Prior Publication Data

US 2006/0239865 A1 Oct. 26, 2006

(30) Foreign Application Priority Data

Jan. 13, 2003 (DE) .................... 103 00 957

(51) Int. Cl.
*B01D 53/04* (2006.01)
*B01D 19/00* (2006.01)
*B01L 3/00* (2006.01)

(52) U.S. Cl. ............... 422/102; 422/99; 422/50

(58) Field of Classification Search ............ 422/102; 210/634, 748; 215/12.2; 436/527; 96/6; 435/7.92

See application file for complete search history.

(56) References Cited

U.S. PATENT DOCUMENTS

| | | | |
|---|---|---|---|
| 3,751,879 A | | 8/1973 | Allington |
| 4,237,096 A | * | 12/1980 | Popoff et al. ............. 422/102 |
| 4,407,665 A | * | 10/1983 | Lasater ..................... 95/266 |
| 4,573,596 A | * | 3/1986 | Slat ........................ 215/12.2 |
| 5,154,832 A | * | 10/1992 | Yamamura et al. ........ 210/640 |
| 5,279,647 A | * | 1/1994 | Gatten et al. ................ 96/6 |
| 5,876,604 A | * | 3/1999 | Nemser et al. ............ 210/634 |
| 5,902,489 A | * | 5/1999 | Yasuda et al. ............ 210/748 |
| 5,922,604 A | | 7/1999 | Stapleton et al. |
| 5,958,714 A | * | 9/1999 | Gordon et al. ............ 435/7.92 |
| 6,159,749 A | * | 12/2000 | Liu ........................ 436/527 |
| 6,506,346 B1 | * | 1/2003 | Monro ..................... 422/102 |
| 2002/0016007 A1 | * | 2/2002 | Keeping et al. .......... 436/514 |

FOREIGN PATENT DOCUMENTS

| | | | |
|---|---|---|---|
| EP | 0488665 A1 | | 6/1992 |
| WO | WO 98/06496 | * | 2/1998 |
| WO | WO 03/008677 | * | 1/2003 |

* cited by examiner

*Primary Examiner*—Walter D Griffin
*Assistant Examiner*—Christine T Mui
(74) *Attorney, Agent, or Firm*—IP Strategies

(57) ABSTRACT

The present invention relates to a sample chamber for a liquid, wherein at least one part in the interior of the sample chamber comprises a fluid-absorbent and/or fluid-permeable plastic, which is essentially degasified in at least one area and/or in which a predetermined fluid and/or predetermined solid is stored in soluble form in at least one area.

27 Claims, 3 Drawing Sheets

SAMPLE CHAMBER FOR A LIQUID

FIELD OF THE INVENTION

The present invention relates to a sample chamber and to a method for supplying and/or discharging a fluid and/or solids to and/or from a liquid.

BACKGROUND OF THE INVENTION

Biological and chemical reactions on molecules (e.g. DNA or proteins) and on cells for analysis or diagnosis are most of the time carried out in (stagnant or flowing) liquids. Under atmospheric conditions liquids generally contain dissolved gases (e.g. $O_2$, $N_2$, $CO_2$). That is why so-called gas bubbles are formed in stagnant liquids. These gas bubbles complicate the analyses and might distort the corresponding results. If a specific reaction, in particular, is to be detected on a carrier wall, such a reaction may be complicated by gas bubbles. Hence, when gas-impermeable sample carriers are used, the liquids must be degasified to prevent the occurrence of gas bubbles.

Especially in microfluid systems which comprise channels in a carrier, gas bubbles may moreover cause clogging or changes in fluidics.

On the other hand, if a sample chamber or a sample carrier consists of a material that can absorb gases, gases absorbed from the environment, for example air, can diffuse during an analysis in an uncontrolled manner into the liquid. This also causes the development of gas bubbles in already degasified liquids. This problem will particularly arise upon changes in temperature of the liquids or sample chambers. When the temperature is increased, the gas solubility in solids and above all in liquids is reduced. Since a one-hundred-percent degasification is hardly possible, it is highly probable that upon an increase in temperature bubbles will also be formed in liquids that have already been "degasified" once.

For example, if a PCR (polymerase chain reaction) is carried out at temperature cycles of 90° C. in a sample chamber of plastic having a high gas capacity, possibly existing gases may pass in conventional methods from a non-degasified plastic in an uncontrolled manner into the sample chamber.

BRIEF SUMMARY OF THE INVENTION

It is therefore the object of the present invention to provide a sample chamber which makes it possible to discharge fluids (gases or liquids) and/or solids in a controlled manner to a liquid and/or to absorb them from a liquid.

According to the invention a sample chamber is provided for a liquid, at least one part in the interior of the sample chamber comprising a fluid-absorbent and/or fluid-permeable plastic, which is essentially degasified in at least one area and/or in which a predetermined fluid and/or predetermined solid is stored in soluble form in at least one area.

The sample chamber according to the invention permits, on the one hand, a degasification of a liquid in the sample chamber if the sample chamber comprises a gas-permeable and/or gas-absorbent area that is degasified and can thus absorb gases from the liquid. On the other hand, predetermined fluids that have previously been stored in an soluble form in an area of the sample chamber can be discharged to the liquid contained in the sample chamber. The sample chamber according to the invention can particularly be used once or repeatedly especially outside laboratories, e.g. for degasifying seawater samples.

According to an advantageous development at least one further part in the interior of the sample chamber comprises a further fluid-absorbent and/or fluid-permeable plastic, which is essentially degasified in at least one area and/or in which a predetermined fluid and/or predetermined solid is stored in soluble form in at least one area.

It is thereby possible to discharge different fluids and/or solids to the liquid specifically in different areas of a sample chamber and/or to absorb them from the liquid.

Preferably, the further plastic may have an absorption coefficient and/or a diffusion constant which differs from that of the one fluid-absorbent and/or fluid-permeable plastic. It is thereby possible to discharge different amounts per time unit of a fluid and/or of solids to a liquid in a controlled manner or to absorb them from a liquid.

According to an advantageous development of all of the previously described sample chambers, it is possible to store a predetermined amount of the fluid and/or solid in a soluble form. This permits, in particular, an exact adjustment of the fluid and/or solid amount to be discharged. To be more specific, the amount can be chosen such that the plastic is saturated with the fluid and/or solid. In general, the substance transportation is in proportion to the surface of the absorbent or permeable area. Hence, in the case of stagnant liquids it is possible to achieve a concentration rising in time or in the case of flowing liquids to achieve a time-dependent decrease in the amount discharged.

According to an advantageous development of the previously described sample chambers fluids and/or solids can be stored in different amounts and/or concentrations in at least two areas. A concentration gradient can thereby be produced within the sample chamber.

In a further advantageous development of the previously described sample chambers a semipermeable or essentially impermeable material can be arranged, particularly in detachable form, on at least one part of the surface of a fluid-absorbent and/or fluid-permeable plastic.

The material may be impermeable to gas, liquid and/or solids. Such a semipermeable or impermeable material prevents the diffusion of a fluid into or out of the plastic. A semipermeable material only permits the diffusion of specific fluids or solids. By detaching the semipermeable or impermeable material from the permeable plastic, the surface of the permeable plastic can be released for diffusion. A fluid-impermeable material may e.g. be a plastic film which is detachably secured by an adhesive to an area of the sample chamber.

According to an advantageous development of all of the previously described sample chambers the sample chamber may be part of a sample carrier. In this instance the supply and/or discharge of a fluid or a solid may particularly be carried out during analysis.

Preferably, the sample carrier may comprise a substrate in which the sample chamber is formed as a channel. Thus the sample chamber may in particular be part of a microfluid system. While a sample liquid is flowing through such a channel or is received in such a channel, fluids and/or solids can be supplied and/or discharged.

Advantageously, the channel may have a ratio of cross-sectional circumference to cross-sectional area of about 10 to 1000, preferably of 20 to 250, most preferably of 50 to 100. Thus the surface of the channel and thus the boundary between liquid and substrate is increased, which improves the supply and/or discharge of fluids and/or solids. For increasing the ratio of cross-sectional circumference to cross-sectional area the substrate may comprise a porous material or nanotubes.

This can for instance be accomplished with an aspect ratio of less than 0.1, preferably less than 0.01, most preferably less than 0.001. Aspect ratio means the ratio of the lateral to the vertical dimension of the channel cross-section; in the case of rectangular channel cross-sections, for example, this is consequently the ratio of height to width, and in the case of ellipsoidal channel cross-sections the ratio of the main axes.

According to a preferred development the above-mentioned substrates have a gas diffusion constant in a range of about $10^{-5}$ cm$^2$/sec to about $10^{-9}$ cm$^2$/sec, preferably of $10^{-7}$ cm$^2$/sec to about $10^{-9}$ cm$^2$/sec. Such a gas diffusion constant promotes the supply and/or discharge of gases to and/or from the liquid in the channel. At the same time, it is avoided, for instance in the case of a degasified substrate that, when the substrate is exposed to air, such air diffuses too rapidly into the substrate. A suitable gas diffusion constant can e.g. be achieved through a surface treatment of the channel in the substrate so as to change the internal cross-linkage of the substrate polymer accordingly.

The substrate may advantageously have a water absorption in a range of about 0.001% to about 0.5%, preferably in a range of about 0.001% to about 0.01%. This achieves a high gas exchange (e.g. by gas absorption of the substrate from the liquid) while the liquid absorption of the substrate is as low as possible.

According to an advantageous development the substrate may have a gas absorption potential of less than about 1 wt % (weight percent), preferably between about 0.005 wt % and 0.1 wt %.

According to an advantageous development the sample carrier may comprise at least one liquid reservoir and the channel may be connected to the at least one liquid reservoir. The liquid may be contained in the liquid reservoir and then be passed into or through the channel where an analysis or chemical reaction is performed.

Advantageously, the at least one liquid reservoir is arranged on the substrate of the sample carrier. It is in this way that the substrate with the channel can be kept thin, which is of particular advantage to microscopic analyses of the liquid in the channel.

In an advantageous development the channel may be introduced into the surface of the substrate that is opposite to the at least one liquid reservoir. Such a sample carrier can therefore particularly be used for inverse microscopy. Since the at least one liquid reservoir is arranged on the other surface of the substrate, it does also not present an obstacle to the analysis.

In an advantageous development of the previously described sample chambers, the substrate and the at least one liquid reservoir may be configured as one piece. This simplifies, on the one hand, the production of the sample carrier because the substrate and the liquid reservoir need no longer be joined in a troublesome manner. Moreover, the use of sealing materials between the liquid reservoirs and the substrate is thereby avoided. In addition, with a one-piece configuration the sterilization of the sample carrier is simplified.

Advantageously, all of the previously described sample carriers consist of plastic. This simplifies processing and reduces the production costs. To be more specific, the whole sample carrier may consist of a fluid-absorbent and/or fluid-permeable plastic.

According to an advantageous development of all of the previously described sample chambers, the sample carrier may comprise integrated galvanic elements, such as Zn/Cu. If these are connected through an electrolyte solution (e.g. $H_2SO_4$), an electrical voltage is created. When the galvanic elements are then brought into contact with a further conductive liquid (e.g. by filling the sample chamber with a Ringer solution) that is not in contact with the electrolyte solution, the circuit is closed. Hence, in this solution a voltage also exists between the galvanic elements. This voltage can e.g. be used for electrophoretic separation.

As a rule, the galvanic elements can simply be immersed into an aqueous medium, resulting in a slight voltage difference. Preferably, the galvanic elements can be integrated at the ends of a channel into the sample carrier and conductively connected to one another. Upon filling of the channel the circuit would then be closed and the galvanic elements would be activated.

Moreover, the invention provides a method for treating a sample chamber for supplying and/or discharging a fluid and/or solids to a liquid, comprising the following steps:

providing a sample chamber for a liquid, particularly as described above, wherein at least one part in the interior of the sample chamber comprises a fluid-absorbent and/or fluid-permeable plastic;

degasifying at least one area of the fluid-absorbent and/or fluid-permeable plastic and/or storing a predetermined fluid and/or predetermined solid in soluble form in at least one area of the fluid-absorbent and/or fluid-permeable plastic.

According to an advantageous development the step of degasifying and/or storing comprises introducing the sample chamber into a predetermined fluid environment.

Due to the predetermined fluid environment a predetermined fluid and/or solids can penetrate into the plastic and can be stored therein. Alternatively, a fluid and/or solids can also diffuse out of the plastic in a specific fluid environment. The predetermined fluid environment can be characterized by parameters such as fluid, pressure, area and/or temperature.

Preferably, the predetermined fluid environment can have a negative pressure or an overpressure. This accelerates the diffusion of the fluid into or out of the environment.

In an advantageous development the fluid may be a liquid in which solids are dissolved, and the step of storing further comprises withdrawal of the liquid. Hence, solids can be stored in the plastic. The solids are dissolved in the liquid which diffuses into the plastic. After withdrawal of the liquid the solids remain in the plastic and can later be removed from the plastic by means of a liquid.

According to an advantageous development of the previously described method, the introduction into a predetermined fluid environment can take place for a predetermined period of time. The amount of the fluid and/or solid stored in the plastic and the amount of the withdrawn fluid and/or solid, respectively, can be adjusted by way of a suitably chosen period of time.

Preferably, the described methods may comprise the further step of arranging, particularly in a detachable manner, a semipermeable or essentially impermeable material on at least one part of the surface of the fluid-absorbent and/or fluid-permeable plastic. Such a material can prevent a situation where a fluid and/or solid further diffuses into or out of the plastic. A plastic film can e.g. be used as the fluid-impermeable material. After detachment of the material a diffusion is made possible again. The material may e.g. be arranged after manufacture of the sample chamber and removed prior to the use of the sample chamber, so that the diffusion begins only shortly before or during use (e.g. an analysis of biological reactions in liquid).

Advantageously, the previously described method may comprise the further step of a fluid-tight, particularly gas-tight, packaging of the sample chamber. Particularly after a predetermined fluid and/or solid has been introduced into or withdrawn from the plastic, such a packaging of the sample chamber helps to maintain said state. It is only after the sample chamber has been unpacked that the fluid and/or the solid diffuses out of or into the plastic.

Preferably, the fluid-tight packing is carried out in a predetermined fluid atmosphere. Said fluid atmosphere is advantageously chosen such that a desired amount of fluid and/or solid remains in the plastic until use of the sample carrier. Alternatively, vacuum packing in a vacuum atmosphere can also be carried out.

Furthermore, the present invention relates to the use of a fluid-absorbent and/or fluid-permeable plastic for supplying and/or discharging a fluid and/or solids to and/or from a liquid.

Preferably, a plastic is used in colloidal form. Such colloids can e.g. be introduced into a sample chamber for a liquid. According to an advantageous alternative, the plastic may be part of one of the above-described sample chambers.

BRIEF DESCRIPTION OF THE DRAWINGS

Further features and advantages of the invention will now be described with reference to the following drawings, in which.

DETAILED DESCRIPTION OF THE INVENTION

Figure 1:
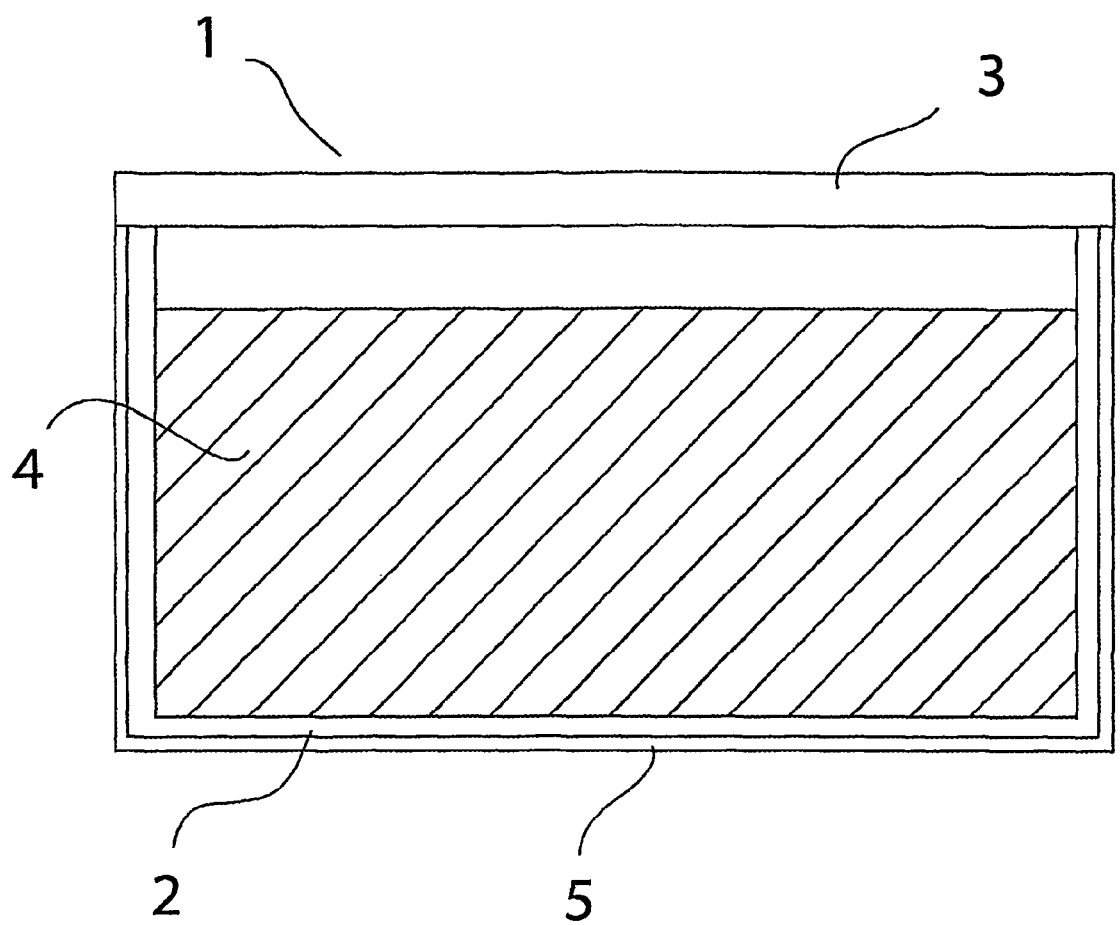
FIG. 1 is a cross-sectional view showing an example of a sample chamber according to the invention.

FIG. 1 shows an example of a sample chamber 1 according to the invention. The sample chamber 1 is formed by plastic walls 2 and comprises a lid 3. The whole plastic wall 2 is gas-absorbent in this example and has been degasified in a vacuum chamber before use. The sample chamber contains a liquid 4, for instance, with molecules or cells to be analyzed. On account of the degasified plastic walls 2, gas contained in the liquid 4 can be absorbed by the plastic walls. To prevent a situation where before or during use of the sample chamber in air the latter diffuses from the outside into the gas-absorbent plastic walls, a gas-impermeable material 5, preferably an air-tight plastic film, is arranged on the outside of the sample chamber. Said plastic film can be firmly or also detachably connected to the plastic walls 2.

If, instead of a degasification of the liquid 4, the liquid is to be charged with gas, the sample chamber can be introduced into a corresponding gas atmosphere, preferably at overpressure, before use, i.e. before filling with liquid, so that the corresponding gas is absorbed by the plastic walls 2 and can be discharged to the liquid 4 during use of the sample chamber.

When gas-permeable plastic walls 2 are used at a predetermined diffusion constant, the plastic film 4 can alternatively be removed from the plastic walls at a specific time and the sample chamber 1 can be introduced into a predetermined gas atmosphere so that gas can diffuse from the outside through the plastic walls 2 in a controlled manner into the liquid.

In all of the described cases a vacuum or also a specific gas atmosphere may be provided between the liquid 4 and the lid 3.

Figure 2:
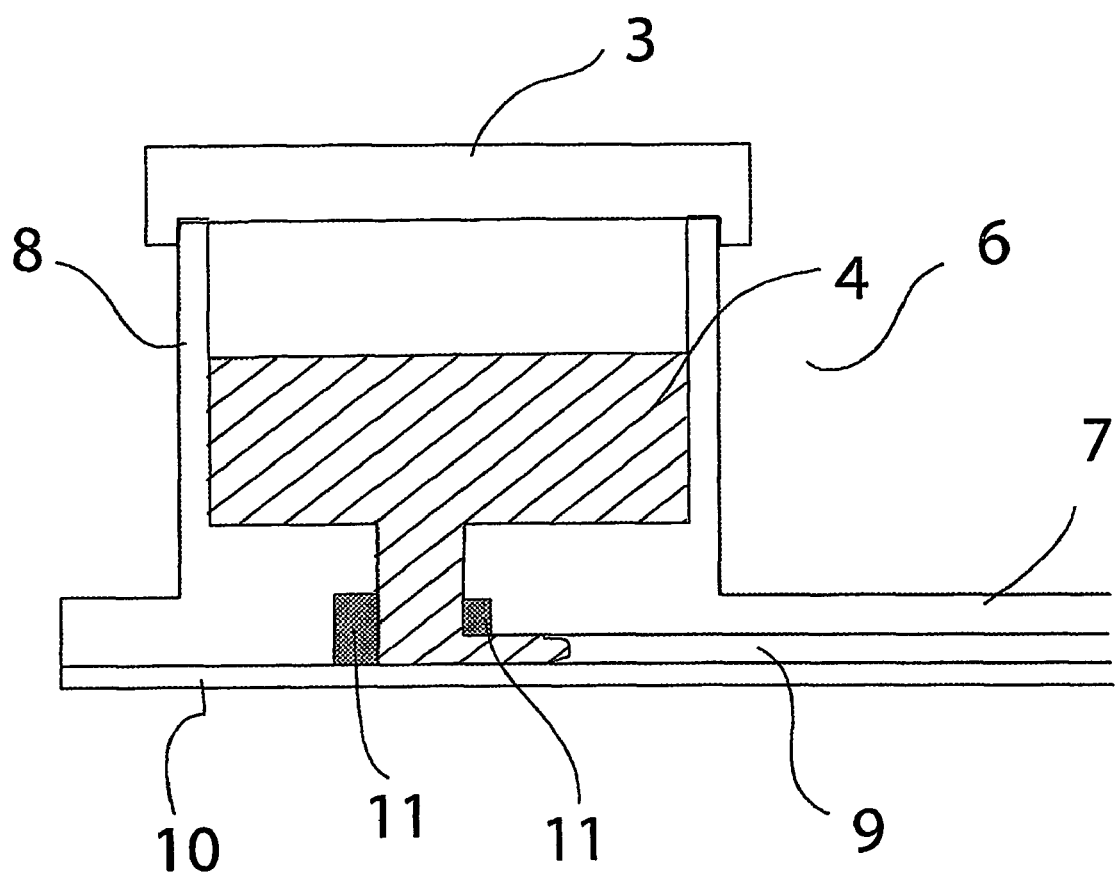
FIG. 2 is a cross-sectional view showing an example of a sample chamber of the invention, which is part of a sample carrier.

FIG. 2 shows a sample carrier 6 in a cross-sectional view, the sample carrier 6 comprising a substrate 7 on which a liquid reservoir 8 is arranged. The sample chamber is introduced as a channel 9 in the bottom side of the substrate 7. In this embodiment, the sample carrier with substrate 7 and liquid reservoir 8 is configured as one piece. The channel 9 is here open downwards and closed by a layer 10. The layer 10 may for example be a plastic film which is secured to the substrate by an adhesive. The illustrated sample carrier 6 can be used in an advantageous manner for methods using inverse microscopy.

The liquid reservoir 8 is partly filled with liquid 4 and closed by a lid 3 in an air-tight manner. A negative pressure prevails between lid and liquid, so that the liquid only extends up to a certain point into the channel 9. At the beginning of the channel 9, solids 11 are stored in the sample carrier, adjoining the channel.

Said solids have been introduced into the sample carrier before by the measure that in said area of the channel a liquid was charged into the channel 9, the corresponding solids being dissolved in said liquid. When a fluid-permeable plastic is used for the sample carrier 6, said liquid can penetrate with the dissolved solids into the plastic. The liquid was subsequently dried up, so that the solids remained in the areas 11 of the sample carrier.

When a sample liquid 4 now contacts the areas 11, the liquid also penetrates in the areas 11 into the sample carrier and dissolves the solids, which are thus absorbed by the liquid 4. Due to the negative pressure between lid and liquid and possibly due to a hydrophobic coating of the channel 9 the liquid does not flow further into the channel. After a specific period of time, for example as soon as an adequate amount of solids has been dissolved in the sample liquid 4, the lid 3 can for example be removed or pierced, so that a negative pressure does not prevail any more. Alternatively, the liquid 4 can also be subjected to overpressure. In both instances the liquid 4 is thus enabled to further flow into the channel 9 in which analyses can then be performed.

The sample carrier 6 may comprise a plurality of such channels that e.g. cross each other or terminate in a joint reservoir. With the described method a controlled flow through the channel system or a joining of several liquids can be accomplished by purposefully applying a negative pressure and an overpressure and by piercing or opening lids, respectively.

Figure 3:
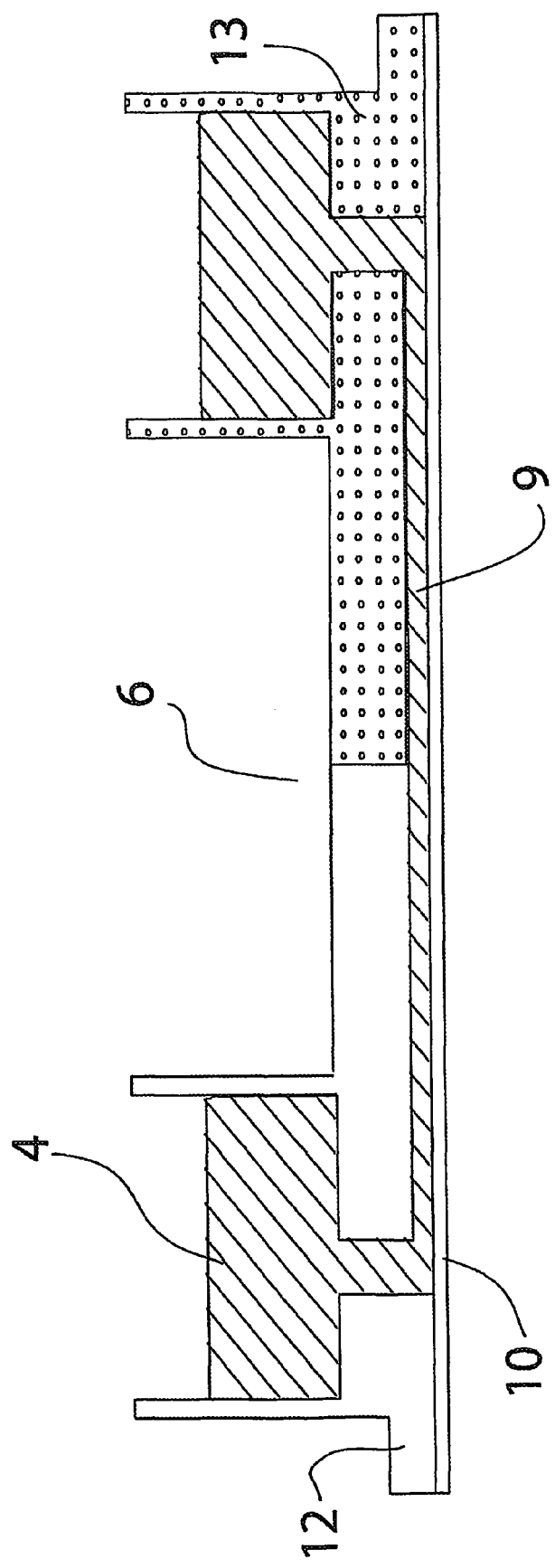
FIG. 3 is a cross-sectional view showing a further example of a sample chamber of the invention, which is part of a sample carrier.

FIG. 3 shows a further embodiment of a sample carrier 6 in a cross-sectional view, the sample chamber being again configured as a channel 9 which is closed by a film 10. In this example, the sample carrier 6 consists of two materials 12 and 13 that are gas-permeable, but have different coefficients of absorption, as illustrated by the different marking. This means that different amounts or concentrations of a gas can be stored in both materials. A concentration gradient can thereby be produced along the channel 9.

For example, the sample chamber may have previously been "charged" in a $CO_2$ atmosphere with $CO_2$ which can then be discharged continuously to the sample liquid even if the sample chamber is contained in a different ambient atmosphere at a later time. Storage periods of up to one week can be realized by selecting a plastic having a high gas capacity and a low diffusion constant. This may particularly be used for analyzing cells over a long period of time. Many cells require a constant supply with $CO_2$; the $CO_2$ supply serves inter alia to maintain the pH value in the liquid. In this instance plastics are preferably used that are only gas-permeable, but not liquid-permeable.

When the materials 12 and 13 shown in FIG. 3 are used as $CO_2$ storage means having different storage capacities, a $CO_2$ gradient, i.e. a pH gradient, can be formed in the channel. In this instance, a very small pH gradient is in general produced;

in another instance, it is possible to use HCl. The gradients produced can particularly be used for analyzing chemotaxis experiments (movement of organisms in a gradient field) or for isoelectric focusing.

Alternatively, the whole substrate may also consist of a plastic that has a gas diffusion constant in a range of about $10^{-5}$ cm$^2$/sec to about $10^{-9}$ cm$^2$/sec and a water absorption in a range of 0.5% to 0.001%. It is thereby avoided on the one hand that the plastic swells up on account of the liquid, and a suitable gas absorption or discharge by the plastic is made possible on the other hand.

With a surface treatment creating an increased internal cross-linkage of the polymer (for example plasma treatment), or by coating surfaces with strongly cross-liked polymers, the diffusion in said layers can be reduced considerably. To permit an optimum gas exchange between liquid and solid, corresponding diffusion-inhibiting layers may for example be very thin; alternatively, or in addition, the channel surface may be treated or coated in different areas in different ways.

At a small aspect ratio the gas exchange is accelerated in a preferred manner due to the large boundary between liquid and channel surface. Furthermore, the surface per volume or the cross-sectional circumference per cross-sectional area can be further increased for high flow rates, for instance by using porous materials or nanotubes.

The fluid storage times in the plastic can be increased by optimizing the plastic volume, the absorption volume and/or by optimizing the absorption surface. Preferably, in the embodiment shown in FIG. 3, the outwardly oriented surfaces can also be sealed with gas-impermeable films.

In an alternative application, one or both materials 12 and 13 can be degasified for preventing the development of gas bubbles in the channel.

It should particularly be mentioned in connection with the example of FIG. 3 that a degasification and/or a gassing of plastics can also be used specifically for accelerating a connection of plastic substrates. The connection may here be established using adhesives or solvents or by chemical or physical activation of the surfaces to be connected. The presence or absence of specific gases in a plastic influences the reaction speed in the connection process.

The solubility product of gases in liquids greatly depends on the temperature. Gas bubbles are formed in non-degasified, but also in already degasified liquids in a sample chamber, especially when the temperature of the liquid is increased. The resulting gas bubbles can then be absorbed by the surrounding degasified plastic.

When degasified plastics are used, the sample chamber is preferably vacuum-packed. Depending on the ratio of the gas capacity and the diffusion constant for gases in the plastic, such an analytical carrier can be used for hours up to days after the vacuum package has been opened.

A degasification of a sample liquid through a gas-permeable plastic can particularly be accelerated when the liquid is passed from a main channel into several side channels having a smaller diameter, so that the contact surface is increased between liquid and plastic.

Suitable fluid-absorbent and/or fluid-permeable materials are above all polycarbonate, COC and COP (particularly suited as gas storing means), PMMA (particularly suited as liquid storing means). As an alternative, it is also possible to use polystyrene, PE, PVC, or PP.

As an alternative to the use of an absorbent plastic as part of the sample chamber, the formation of gas bubbles in a sample chamber can also be controlled in that colloids are used having a defined gas capacity and gas permeability. These can directly be introduced into the sample chamber. The gas discharge in time or the absorption cycles can be adjusted by suitably selecting the surface/volume ratio.

It goes without saying that the features described in the embodiments are not to be understood in a restrictive sense and can also be realized in combinations differing from those that have been described.

The invention claimed is:

1. A sample chamber for a liquid,
wherein the sample chamber is part of a sample carrier, at least part of the walls of the sample chamber being formed of a plastic material,
wherein at least one part of the walls formed of the plastic material comprises a gas-absorbent and/or gas-permeable plastic, which is essentially degasified in at least one area and/or in which a predetermined gas is stored in soluble form in at least one area, and
wherein the gas-absorbent and/or gas-permeable plastic provides for at least one of supplying the predetermined gas to the liquid and discharging gas from the liquid.

2. The sample chamber according to claim 1, wherein at least one further part in the interior of the sample chamber comprises a further gas-absorbent and/or gas-permeable plastic, which is essentially degasified in at least one area and/or in which a predetermined gas is stored in soluble form in at least one area.

3. The sample chamber according to claim 2, wherein the further gas-absorbent and/or gas-permeable plastic of the at least one further part in the interior of the sample chamber has an absorption coefficient and/or a diffusion constant that differs from that of the one gas-absorbent and/or gas-permeable plastic.

4. The sample chamber according to claim 1, wherein a predetermined amount of the gas is stored in soluble form.

5. The sample chamber according to claim 1, comprising at least two areas in which gases are stored in different amounts and/or concentrations.

6. The sample chamber according to claim 1, wherein a semipermeable or essentially impermeable material is arranged, particularly in detachable form, on at least one part of the surface of a gas-absorbent and/or gas-permeable plastic.

7. The sample chamber according to claim 1, wherein the sample carrier comprises a substrate in which the sample chamber is configured as a channel.

8. The sample chamber according to claim 7, wherein the channel has a ratio of cross-sectional circumference to cross-sectional area of about 10 to 1000, preferably of 20 to 250, most preferably of 50 to 100.

9. The sample chamber according to claim 7, wherein the substrate has a gas diffusion constant in a range of about $10^{-5}$ cm$^2$/sec to about $10^{-9}$ cm$^2$/sec, preferably of $10^{-7}$ cm$^2$/sec to about $10^{-9}$ cm$^2$/sec.

10. The sample chamber according to claim 9, wherein the substrate shows a water absorption in a range of about 0.001% to about 0.5%, preferably in a range of about 0.001% to about 0.01%.

11. The sample chamber according to claim 7, wherein the substrate shows a gas absorption potential of less than about 1 wt %, preferably between about 0.005 wt % and 0.1 wt %.

12. The sample chamber according to claim 7, wherein the sample carrier comprises at least one liquid reservoir and the channel is connected to the at least one liquid reservoir.

13. The sample chamber according to claim 12, wherein the at least one liquid reservoir is arranged on the substrate of the sample carrier.

14. The sample chamber according to claim 13, wherein the channel is incorporated into the surface of the substrate which is opposite to the at least one liquid reservoir.

15. The sample chamber according to claim 12, wherein the substrate and the at least one liquid reservoir are configured as one piece.

16. The sample chamber according to claim 1, wherein the sample carrier consists of plastic.

17. The sample chamber according to claim 1, wherein the sample carrier comprises integrated galvanic elements.

18. A method for treating a sample chamber for supplying and/or discharging a gas to a liquid, comprising the following steps:

providing a sample chamber for a liquid, particularly according to claim 1, wherein at least one part in the interior of the sample chamber comprises a gas-absorbent and/or gas-permeable plastic;

degasifying at least one area of the gas-absorbent and/or gas-permeable plastic and/or storing a predetermined gas in soluble form in at least one area of the gas-absorbent and/or gas-permeable plastic.

19. The method according to claim 18, wherein the step of degasifying and/or storing comprises introducing the sample chamber into a predetermined fluid environment.

20. The method according to claim 19, wherein a negative pressure or an overpressure is chosen for the predetermined fluid environment.

21. The method according to claim 19, wherein the introduction into a predetermined fluid environment takes place for a predetermined period.

22. The method according to claim 18, comprising the further step of arranging, particularly in detachable form, a semipermeable or essentially impermeable material on at least one part of the surface of the gas-absorbent and/or gas-permeable plastic.

23. The method according to claim 18, comprising the further step of a fluid-tight, particularly gas-tight, packing of the sample chamber.

24. The method according to claim 23, wherein the fluid-tight packing takes place in a predetermined fluid atmosphere.

25. The sample chamber according to claim 1, wherein the gas-absorbent and/or gas-permeable plastic provides for supplying and/or discharging the predetermined gas to and/or from a liquid.

26. A sample carrier comprising the sample chamber according to claim 1, wherein the sample carrier comprises a plastic substrate in which the sample chamber is formed, and wherein the plastic substrate is essentially degasified in at least one area and/or a predetermined gas is stored in soluble form in at least one area of the plastic substrate.

27. The sample carrier according to claim 26, wherein the gas-absorbent and/or gas-permeable plastic provides for supplying the predetermined gas to and/or discharging gas from the liquid.

* * * * *